United States Patent [19]

Lin

[11] Patent Number: 5,183,967
[45] Date of Patent: Feb. 2, 1993

[54] JUNCTION BOX

[76] Inventor: Mao S. Lin, No. 165-1, Kuo Ching Road, Pan-Chiau, Taipei Hsien, Taiwan

[21] Appl. No.: 777,144

[22] Filed: Oct. 16, 1991

[51] Int. Cl.$^5$ ............................................. H05K 5/00
[52] U.S. Cl. ................................... 174/52.1; 220/3.2; 220/4.02; 361/390
[58] Field of Search ............... 174/50, 52.1, 59, 65 R; 361/332, 356, 380, 390, 419; 220/3.2, 3.3, 3.4, 3.8, 4.02

[56] References Cited

U.S. PATENT DOCUMENTS 5,038,000 8/1991 Westbrook et al. ............... 174/52.1

FOREIGN PATENT DOCUMENTS 0268418 11/1988 Japan .................................. 174/52.1

Primary Examiner—Gerald P. Tolin
Assistant Examiner—Bot L. Ledynh

[57] ABSTRACT

A junction box comprising a cover (1) covered on a base (3) with an adapter (2) secured therein for connecting a telephone line to an exchange line, wherein the cover has pressure rods (11) pressed downwards against the adapter (2); the base (3) has stop bars (34) and lugs (33) at two opposite locations for supporting and holding the adapter (2) in place; the adapter (2) has a bottom projection (22) hooked in a groove (35) on the base (3) for positioning.

3 Claims, 9 Drawing Sheets

JUNCTION BOX

DESCRIPTION

The present invention relates to junction boxes and relates more particularly to a junction box having an adapter therein for connecting a telephone line to an exchange line.

In telecommunications, a junction box is generally used for connecting the telephone line from a telephone set to an exchange line. The main disadvantage of this junction box is its required complicated installation procedure. Further, a tool must be used during the installation or maintenance process.

The present invention has been accomplished to eliminate the aforesaid disadvantages. It is therefore an object of the present invention to provide a junction box which is easy to assemble, install and maintain. It is another object of the present invention to provide a junction box which consists of less component parts and the manufacturing cost of which is greatly reduced. It is still another object of the present invention to provide a junction box in which the adapter which is used for connecting two communication wires together is replaceable. It is still another object of the present invention to provide a junction box which is durable in use and ensures high transmission performance. To achieve the aforesaid objects, there is provided a junction box which is generally comprised of a cover covered on a base with an adapter secured therein for connecting a telephone line to an exchange line, wherein said cover has pressure rods pressed downwardly against said adapter; said base has stop bars and lugs at two opposite locations for supporting and holding said adapter in place; said adapter has a bottom projection hooked in a groove on said base for positioning. The cover may be secured to the base by a screw which is inserted through a hole of the cover into a bolt hole on the base. In an alternate form, two hooked strips are made on the cover respectively hooked in two retaining slots on the base, and therefore, the connection between the cover and the base is secured. Further, the size and internal structure of the base and the cover are made according to the number of adapters fastened therein.

The present invention will now be described by way of example only with reference to the annexed drawings, in which.

Figure 1:
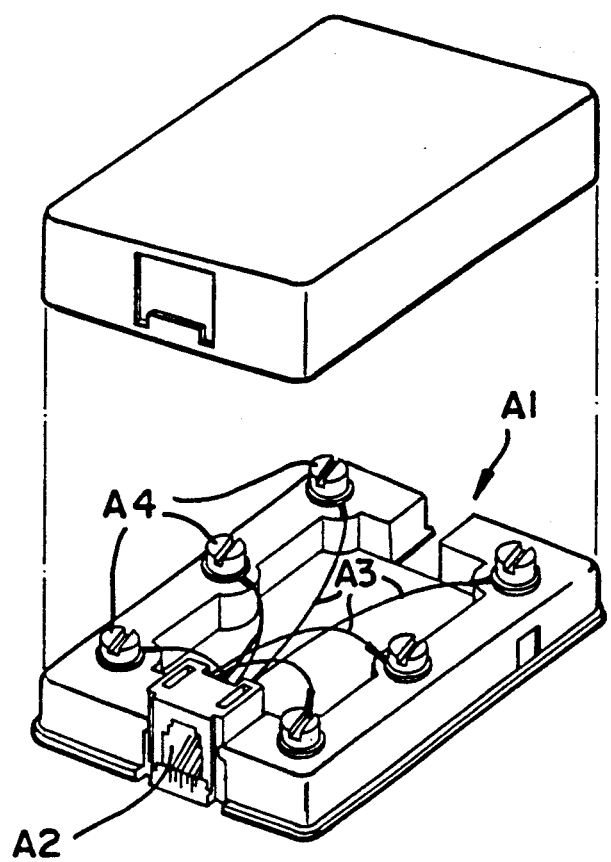
FIG. 1 shows a prior art junction box having a rear wire hole A1 for inserting an exchange line, a front wire hole A2 for inserting a telephone line, and a plurality of screws A4 for fastening conductors A3 from the exchange and telephone lines.
Figure 2:
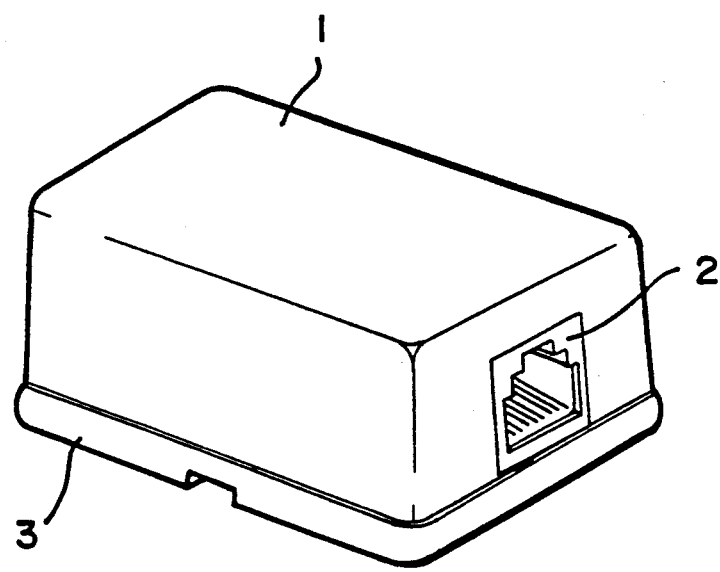
FIG. 2 is an elevational view of a junction box embodying the present invention.

Turning now to the annexed drawings in detail and referring first to FIGS. 2 and 3, a junction box as constructed in accordance with the present invention is generally comprised of a cover 1, a base 3 and an adapter 2. The cover 1 and the base 3 are connected by screws or any of a variety of fastening methods, forming into a casing for holding the adapter 2 therein.

Figure 3A:
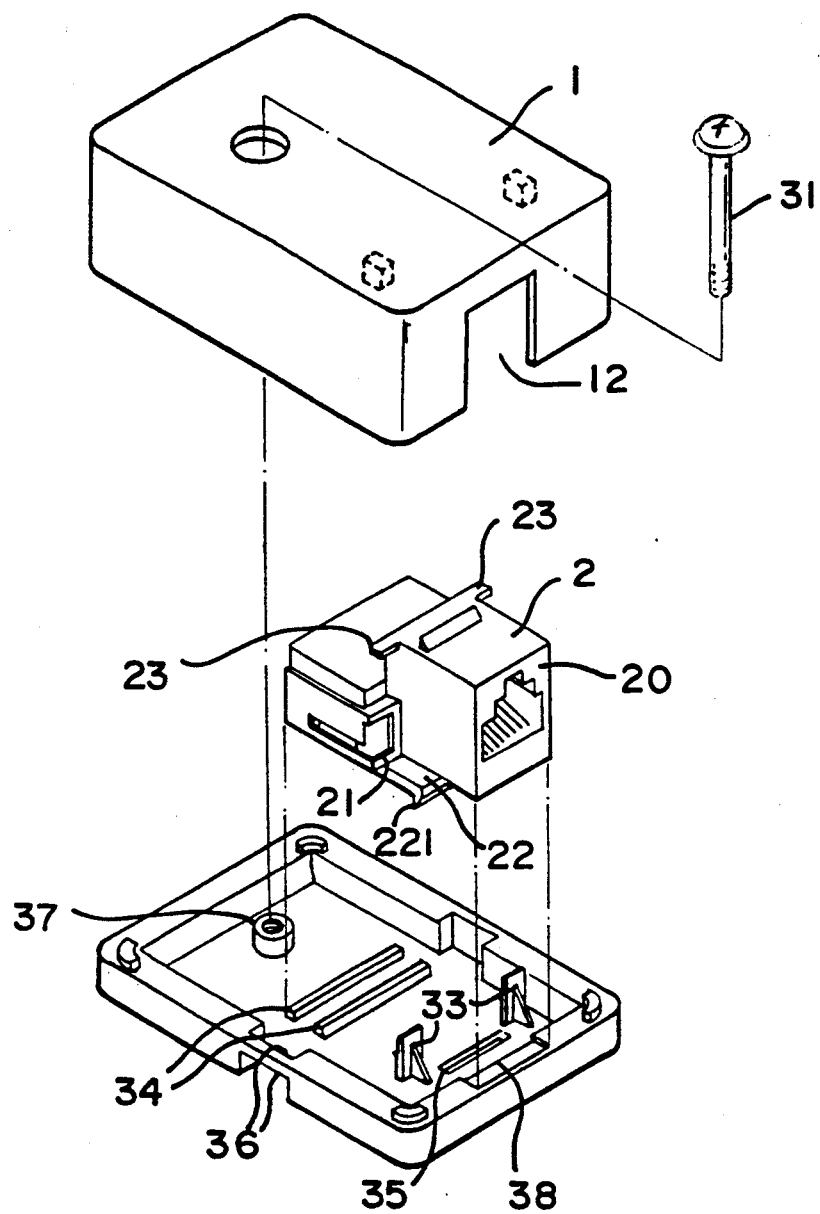
FIGS. 3a and 3b depict an alternative cover structure and an exploded perspective view of the embodiment of FIG. 2, respectively.
Figure 3B:
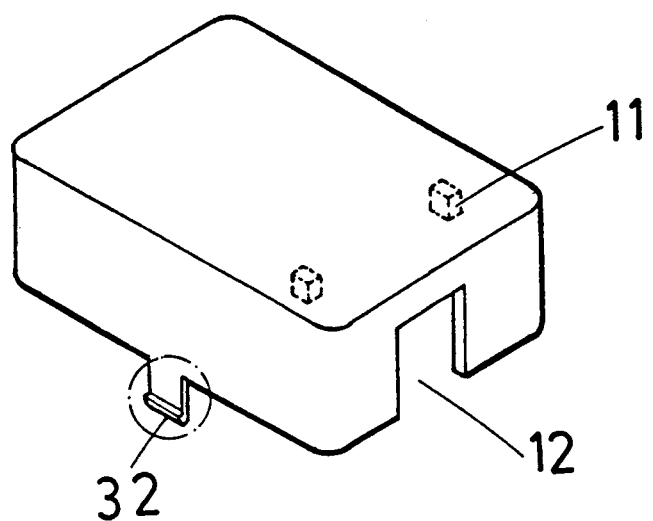

As illustrated in FIGS. 3a and 3b, the base 3 has two lugs 33, two stop bars 34, a first groove 35, two side slots 36 or fastening hole 37, and a second groove 38 respectively made thereon at suitable locations; the cover 1 has two pressure rods 11, a front notch 12, and a wire hole 13 respectively made thereon at suitable locations. The adapter 2 has a retaining strip 22 on the bottom edge thereof, a jack 20 on the front end thereof, two opposite projections 23 at the top, and two side blocks 21 at two opposite sides, wherein said retaining strip 22 has a bottom projection 221 projecting from the bottom edge thereof. By inserting a screw 31 through a hole on the cover 1 into the fastening hole 37 on the base 3, the cover 1 is firmly secured to the base 3. Further, hooked strips 32 may be made on the cover 1 at two opposite locations corresponding to the two side slots 36 for fastening.

Figure 4:
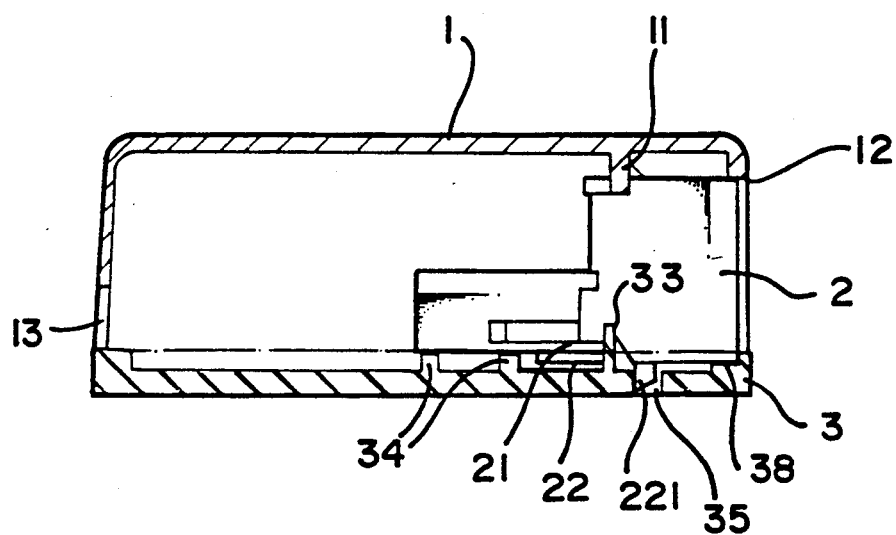
FIG. 4 is a sectional side view of embodiment of FIG. 2.

Referring to FIG. 4, the adapter 2 is mounted on the base 3 supported by the stop bars 34 with the front ends of the two side blocks 21 thereof respectively stopped against the two lugs 33 on the base 3, with the rear end of the retaining strip 22 thereof stopped against the front one of the two stop bars 34 and with the bottom projection 221 on the retaining strip 22 thereof respectively inserted into the first groove 35 on the base 3. Therefore, the adapter 2 is firmly retained in the base 3. Once the adapter 2 is fastened in the base 3, the jack 20 thereof is disposed above the second groove 38 on the base 3. When the cover 1 is secured to the base 3, the front wall surface of the adapter 2 is flush with the front wall surface of the cover 1.

Referring to FIG. 4 again, when the cover 1 covers on the base 3, the jack 20 on the adapter 2 is retained at the front notch 12 on the cover 1 for connecting a plug, the two pressure rods 11 on the cover 1 are pressed against the two opposite projections 23 to firmly secure the adapter 2 in the base 3.

Figure 5:
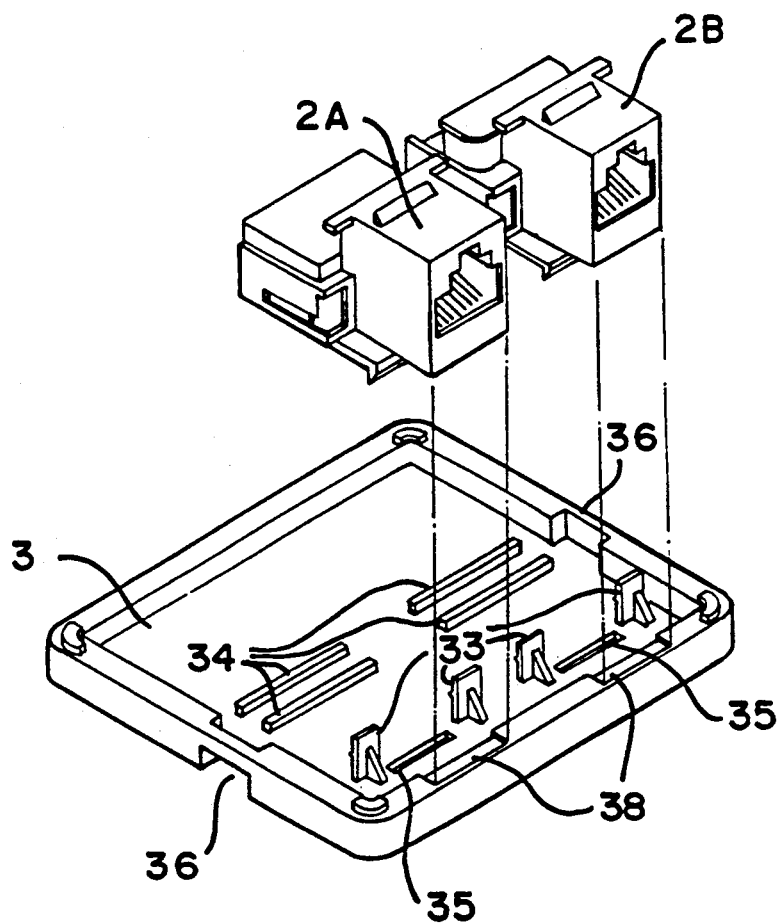
FIG. 5 illustrates an alternate form of junction box according to the present invention, in which two adapters are simultaneously used.
Figure 6A:
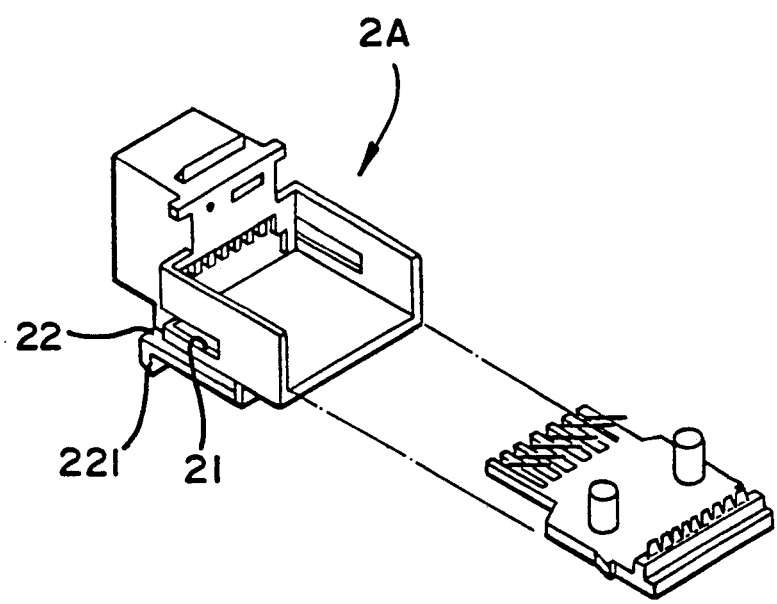
FIGS. 6a, 6b and 6c illustrate a structure of an adapter as used in the present invention.
Figure 6B:
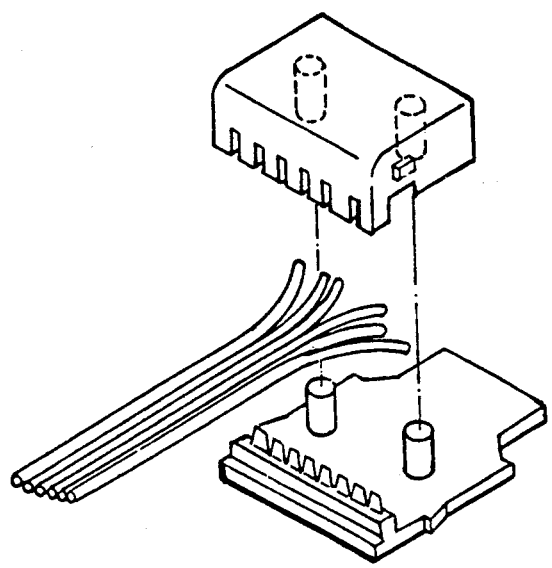
Figure 6C:
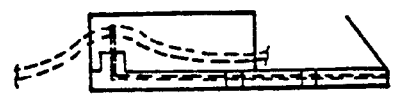
Figure 7:
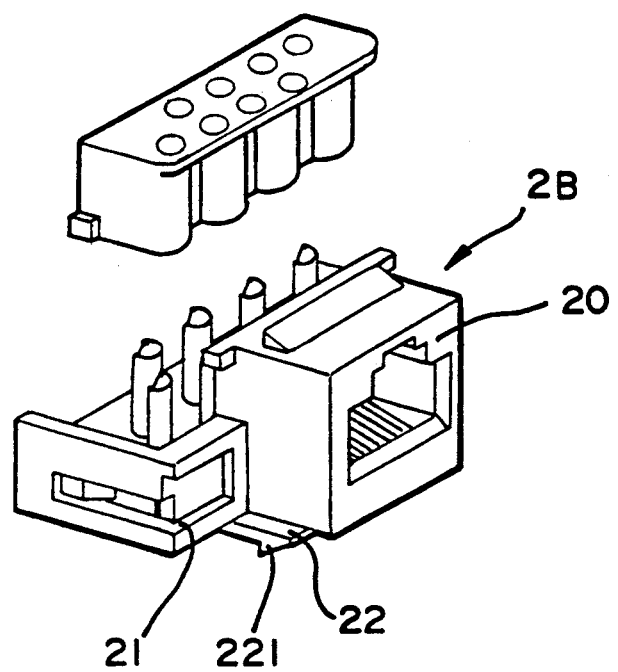
FIG. 7 illustrates another structure of an adapter as used in the present invention.

Referring to FIG. 5, therein illustrated is an alternate form of the present invention, in which the number of the stop bars 34, lugs 33, first and second grooves 35, 38 is doubled for holding two adapters. When more adapters are used, the number of the stop bars, lugs and grooves shall be proportionally increased. Further, either structure of adapter 2A as illustrated in FIGS. 6a, 6b and 6c, or adapter 2B, as illustrated in FIG. 7, can be used in the present invention.

What is claimed is:

1. A junction box, comprising a cover covered on a base holding at least one adapter therein, wherein said cover comprises at least one pair of pressure rods, at least one wire hole for inserting an exchange line, and at least one front notch; said at least one adapter each comprises a retaining strip on the bottom edge thereof, a jack on the front end thereof retained in said at least one front notch for connecting a telephone line by a plug, two opposite projections at the top stopped by said at least one pair of pressure rods, and two side blocks at two opposite sides, said retaining strip having a bottom projection projecting from the bottom edge thereof; and said base comprises at least one pair of lugs stopped against said two side blocks at the front, at least one first groove into which said bottom projection on said retaining strip is inserted, at least one pair of stop bars for supporting said at least one adapter, said at least one pair of stop bars including a first stop bar stopped against said retaining strip at the back, and a second groove for holding said jack in position.

2. The junction box of claim 1, wherein said cover is secured to said base by fastening a screw through a hole on said cover into a bolt hole on said base.

3. The junction box of claim 1, wherein said cover has two hooked strips respectively hooked in two retaining slots on said base at two opposite sides to firmly secure said base thereto.

* * * * *